(12) United States Patent
Van Calcar et al.

(10) Patent No.: US 6,471,921 B1
(45) Date of Patent: *Oct. 29, 2002

(54) MIXED IONIC AND ELECTRONIC CONDUCTING CERAMIC MEMBRANES FOR HYDROCARBON PROCESSING

(75) Inventors: Pamela Van Calcar, Superior, CO (US); Richard Mackay, Lafayette, CO (US); Anthony F. Sammells, Boulder, CO (US)

(73) Assignee: Eltron Research, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/314,708

(22) Filed: May 19, 1999

(51) Int. Cl.$^7$ .................................................. B01J 8/00

(52) U.S. Cl. ........................... 422/239; 422/240; 502/4; 502/525; 252/521.1; 252/519.1; 252/519.15

(58) Field of Search ...................... 502/4, 525; 422/239, 422/240; 252/521.1, 519.1, 519.15

(56) References Cited

U.S. PATENT DOCUMENTS

| | | | |
|---|---|---|---|
| 3,535,163 A | 10/1970 | Dzieciuch et al. ............. | 136/6 |
| 3,607,863 A | 9/1971 | Dosch ........................ | 260/209 |
| 3,754,951 A | 8/1973 | Coatney ....................... | 106/58 |

(List continued on next page.)

FOREIGN PATENT DOCUMENTS

| | | |
|---|---|---|
| EP | 399 833 | 11/1990 |
| EP | 673 675 | 9/1995 |
| EP | 705 790 | 4/1996 |
| EP | 766 330 | 4/1997 |
| EP | 438 902 | 5/1997 |
| GB | 2203446 | 3/1988 |
| WO | 94/24065 | 10/1994 |
| WO | 97/41060 | 11/1997 |
| WO | 99/21649 | 5/1999 |

OTHER PUBLICATIONS

Teraoka et al. (1988) Mat. Res. Bull. 23:51–58.
Teraoka et al. (1985) Chem. Lett. 1743–1746.
Teraoka et al. (1988) Chem. Lett. 503–506.
Matsumoto et al. (1980) J. Electrochem. Soc. 127(11):2360–2364.
Goodenough et al. (1990) Solid State Ionics 44:21–31.
Zhen, Y.S. and Goodenough, J.B. (1990) Mat. Res. Bull. 25:785–790.
Gallagher et al. (1964) J. Chem. Phys. 41(8):2429–2434.
Greaves et al. (1975) Acta Cryst. B31:641–646.
Sammells et al. (1992) Solid State Ionics 52:111–123.
Cook, R.L. and Sammells, A.F. (1991) Solid State Ionics 45:311–321.
Cook et al. (1990) J. Electrochem. Soc. 137:3309–3310.
Teraoka et al. (1985) Chem. Lett. 1367–1370.
Crepin, M. and Hall, K.W. (1981) J. Catal. 69:359–370.
Chick et al. (1990) Mater. Lett. 10(1,2):6–12.

(List continued on next page.)

Primary Examiner—Marian C. Knode
Assistant Examiner—Basia Ridley
(74) Attorney, Agent, or Firm—Greenlee, Winner and Sullivan, P.C.

(57) ABSTRACT

The invention relates to mixed phase materials for the preparation of catalytic membranes which exhibit ionic and electronic conduction and which exhibit improved mechanical strength compared to single phase ionic and electronic conducting materials. The mixed phase materials are useful for forming gas impermeable membranes either as dense ceramic membranes or as dense thin films coated onto porous substrates. The membranes and materials of this invention are useful in catalytic membrane reactors in a variety of applications including synthesis gas production. One or more crystalline second phases are present in the mixed phase material at a level sufficient to enhance the mechanical strength of the mixture to provide membranes for practical application in CMRs.

17 Claims, 7 Drawing Sheets

U.S. PATENT DOCUMENTS

| | | | |
|---|---|---|---|
| 4,083,730 A | 4/1978 | Kwech et al. | 106/89 |
| 4,330,633 A | 5/1982 | Yoshisato et al. | 501/152 |
| 4,791,079 A | 12/1988 | Hazbun | 504/4 |
| 4,793,904 A | 12/1988 | Mazanec et al. | 204/59 |
| 4,802,958 A | 2/1989 | Mazanec et al. | 204/80 |
| 4,827,071 A | 5/1989 | Hazbun | 585/443 |
| 4,848,984 A | 7/1989 | Ezis et al. | 51/309 |
| 4,933,054 A | 6/1990 | Mazanec et al. | 204/80 |
| 5,139,077 A | 8/1992 | Das et al. | 164/66.1 |
| 5,160,618 A | 11/1992 | Burggraaf et al. | 210/500.25 |
| 5,160,713 A | 11/1992 | Mazanec et al. | 423/210 |
| 5,210,059 A | 5/1993 | Matturo et al. | 502/4 |
| 5,240,480 A | 8/1993 | Thorogood et al. | 96/4 |
| 5,306,411 A | 4/1994 | Mazanec et al. | 204/266 |
| 5,356,728 A | 10/1994 | Balachandran et al. | 429/8 |
| 5,366,712 A | 11/1994 | Violante et al. | 423/248 |
| 5,393,325 A | 2/1995 | Edlund | 95/56 |
| 5,397,541 A | 3/1995 | Post | 422/88 |
| 5,430,209 A | 7/1995 | Agaskar et al. | 585/315 |
| 5,466,646 A | 11/1995 | Moser | 502/60 |
| 5,591,315 A | 1/1997 | Mazanec et al. | 205/462 |
| 5,624,542 A * | 4/1997 | Shen et al. | 204/283 |
| 5,639,437 A | 6/1997 | Balachandran et al. | 423/593 |
| 5,648,304 A | 7/1997 | Mazanec et al. | 501/134 |
| 5,693,212 A | 12/1997 | Mazanec et al. | 205/462 |
| 5,702,999 A | 12/1997 | Mazanec et al. | 501/152 |
| 5,714,091 A | 2/1998 | Mazanec et al. | 252/373 |
| 5,723,035 A | 3/1998 | Mazanec et al. | 204/295 |
| 5,744,015 A | 4/1998 | Mazanec et al. | 204/295 |
| 5,779,904 A | 7/1998 | Ruderman et al. | 210/500.25 |
| 5,788,748 A | 8/1998 | Mazanec et al. | 96/4 |
| 5,821,185 A | 10/1998 | White et al. | 502/4 |
| 5,911,860 A * | 6/1999 | Chen et al. | 204/295 |
| 6,033,632 A * | 3/2000 | Schwartz et al. | 210/500.25 |
| 6,037,514 A * | 3/2000 | White et al. | 585/502 |
| 6,146,549 A * | 11/2000 | Mackay et al. | 252/373 |
| 6,165,431 A * | 12/2000 | Mackay et al. | 423/219 |

OTHER PUBLICATIONS

Pederson et al. (1991) Mater. Lett. 10(9,10):437–443.

van der Pauw (1958) Philips Res. Rep. 13(1):1–9.

Rostrup–Nielson, J.R. and Bak Hansen, J.–H. (1993) J. Catalysis 144:38–49.

Sammells, T., (1991), "Rational Selection of Perovskites for Solid Electrolytes and Electrocatalysis," Presented at BP America Research, Warrenville Research Center, Sep. 16, 1991, 46pp.

Pujare, N U and Sammells, A.F. (1988) J. Electrochem. Soc. 135(10):2544–2545.

Shin, S. and Yonemura, M. (1978) Mat. Res. Bull. 13:1017–1021.

Teraoka, Y. et al. (1989) J. Ceram. Soc. Jpn. Inter. Ed. 97:458–462.

Teraoka, Y. et al. (1989) J. Ceram. Soc.Jpn. Inter. Ed. 97:523–529.

Kuchynka, D.J. et al. (1991) J. Electrochem. Soc. 138(5):1284–1299.

Sammells, A.F. and Cook, R.L. (1991), "Rational Selection of Advanced Solid Electrolytes for Intermediate Temperature Fuel Cells," presented at the Ceramic Conductors for Solid–State Electrochemical Devices Meeting, May 12–15, 1991, Snowbird, UT, (abstract only).

Schwartz, M. et al. (1993) J. Electrochem. Soc. 140(4):L62–L63 (April).

* cited by examiner

MIXED IONIC AND ELECTRONIC CONDUCTING CERAMIC MEMBRANES FOR HYDROCARBON PROCESSING

STATEMENT REGARDING FEDERALLY SPONSORED RESEARCH OR DEVELOPMENT

This invention was made with Government support under Grant No. DE-FG02-94ER81750 awarded by the Department of Energy. The Government has certain rights in the invention.

BACKGROUND OF THE INVENTION

A class of brownmillerite-derived materials have been found to be mixed ionic and electronic conductors (MIEC). See: PCT/US96/14841, filed Sep. 13, 1996. Gas-impermeable membranes made from MIECs behave as short-circuited electrochemical cells, in which oxygen anions and electrons conduct in opposite directions through the membrane. The oxygen anion conductivity of these materials make them useful for the efficient generation of pure oxygen which can be employed in catalytic oxidation reactions. The electronic conductivity of these materials provides for spontaneous gas phase separation and any subsequent oxidation without the addition of external electronic circuitry. MIEC membranes have found application in catalytic membrane reactors (CMRs) for a variety of processes where oxygen reacts with inorganic or organic species, such as hydrocarbons, including but not limited to the partial oxidation of methane and other hydrocarbons to synthesis gas, the oxidative coupling of aliphatic and aromatic hydrocarbons, and the gasification of coal. CMR processes can also include decomposition of organic environmental pollutants such as PCBs. These membranes can simply be used for the separation of oxygen from oxygen-containing gas (e.g., air) and the production of pure oxygen.

In operation, the ceramic membranes of CMRs are exposed to net oxidizing and reducing atmospheres on opposite sides of the membrane. The stresses imposed on the ceramic membranes arise from chemical expansion as well as thermal expansion. The membranes may also be exposed to significant pressure differentials up to about 500 psi. While reactor design can be optimized to minimize these stresses, brittleness and cracking of membrane materials after short term operation is a significant problem. Thus, there is a need in the art for ceramic membrane materials, particularly for long-term reactor operation, that retain excellent ionic and electronic conductivities and which, in addition, exhibit improved mechanical strength under reactor operating conditions.

SUMMARY OF THE INVENTION

This invention relates to ceramic compositions for use in ceramic membranes which contain multiple crystalline phases wherein the predominant phase is a MIEC. The ceramic compositions contain one or more second crystalline phases distinct from the MIEC phase which do not significantly contribute to ionic or electronic conductivity, but which enhance the mechanical strength of the composition. Mechanical strength of membrane made of these mixed phase materials is enhanced, particularly under CMR operating conditions. The presence of one or more second phases in a ceramic material significantly enhances the mechanical strength of the composition for use as a membrane in CMR applications. MIEC materials in general can be strengthened by the addition of second phases to decrease their brittleness and facilitate their practical application in CMRs. The mechanical strength of MIEC membranes that contain mixed ionic and electronic conducting brownmillerite-derived ceramics are particularly benefitted by the introduction of second phases.

In preferred ceramic compositions, the MIEC phase of the ceramic materials of this invention represents about 80 wt % or more of the composition. In more preferred compositions, the MIEC phase represents about 90 wt % or more of the composition. Lower levels (up to about 5 wt %) of second phases can arise as impurities during the preparation of MIEC materials, because of impurities in starting material resulting in inaccuracies in measurement of metal stoichiometries prior to reaction. Second phases can be selectively added to MIEC up to about 20 wt % by mixing components in off-stoichiometric amounts, i.e., by adding additional amounts of one or more metal precursors. The amount of second phase(s) which can be present in the final ceramic products (membranes) and improve their mechanical properties can vary most generally between about 0.1 wt % and about 20 wt %.

More specifically, mixed phase ceramic materials combining an MIEC phase from about 80 wt % to about 99 wt %, and a second phase or phases from about 1 wt % to about 20 wt % are useful for producing improved membranes of this invention.

Ceramic membranes of this invention can have any shape, form or dimensions suitable for use in various CMRs. In particular, membranes can be tubes of various diameters and lengths and flat plates or disks of various diameters. Ceramic membranes can be substantially composed of mixed phase ceramic as a dense material with membrane thicknesses ranging from about 0.5 to about 2 mm. Alternatively, gas impermeable membranes can be composed of a porous substrate supporting a dense thin film of the mixed phase ceramic, typically having a film thickness of about 1 $\mu$m to about 300 $\mu$m, more preferably having a thickness of 10 $\mu$m to about 100 $\mu$m.

Preferred mixed phase materials of this invention contain a sufficient amount of second phase to provide enhanced mechanical properties to the material (compared to a corresponding single-phase MIEC material) without significant detrimental effect upon the ionic and electronic conductivity of the mixed phase material. More specifically, in preferred mixed phase materials, the amount of the second phase(s) present is optimized to reduce breakage from handling and cutting in the preparation of membranes and to reduce breakage and cracking of membranes or thin films associated with thermal and chemical shock to the membrane during CMR operation. Further, the second phase(s) preferably do not substantially react with reactive gases during CMR operation to cause decomposition and failure of the membranes.

Mixed phase materials of this invention include those that contain about 1 wt % or more of second phases, those that contain about 2–4 wt % or more of second phases and those that contain 5 wt % or more of second phases. Preferred second phases are pseudo-binary and pseudo-ternary phases formed from the same (or fewer) elements as the mixed conductors. The second phases need not be ionic or electronic conductors and they need not be in thermodynamic equilibrium with the MIEC materials.

MIEC brownmillerite-derived ceramics are of general composition:

$A_xA'_{x'}A''_{2-(x+x')}B_yB'_{y'}B''_{2-(y+y')}O_{5+z}$, where A is an element from the f block lanthanide elements; A' is an element selected from the Group 2 elements, A" is an element from the f block lanthanide or Group 2 elements; B is an element selected from Al, Ga, In or mixtures thereof; B' and B" are different elements and are selected independently from the group of elements Mg, and the d-block transition elements, including Zn, Cd, or Hg ; $0<x<2$, $0<x'<2$, $0<y<2$, $0<y'<2$ where $x+x'\leq 2$ and $y+y'\leq 2$, and z varies to maintain electroneutrality. A" and B" may or may not be present.

The lanthanide metals include the f block lanthanide metals: La, Ce, Pr, Nd, Pm, Sm, Eu, Gd, Tb, Dy, Ho, Er, Tm, Yb, and Lu. Yttrium has properties similar to the f block lanthanide metals and is also included herein in the definition of lanthanide metals. A is preferably La or Gd, with La more preferred. Group 2 metal elements of the Periodic Table (also designated Group 2a) are Be, Mg, Ca, Sr, Ba, and Ra. The preferred Group 2 elements for the A' element of the materials of this invention are Ca, Sr and Ba and Sr is most preferred. The more preferred B elements are Ga and Al, with Ga more preferred. The d block transition elements include Sc, Ti, V, Cr, Mn, Fe, Co, Ni, Cu, and Zn. Preferred B' and B" elements are Mg, Fe and Co, with Fe and Co being more preferred as B' and B", respectively.

The value of z in the above formula depends upon the values of x, x', y and y' and the oxidation states of the A, A'A", B, B' and B" elements. The value of z is such that the mixed metal oxide material is charge neutral. In preferred materials, $0<z<1$.

In preferred MIEC materials of this formula $0.05<x<1$, $1<x'<1.95$, $0.25<y<1.2$, and $0.8<y'<1.75$. In more preferred MIEC materials of this formula $0.2<x<0.6$, $1.4<x'<1.8$, $0.6<y<1.0$, and $1.0<y'<1.4$.

Second phases employed in the ceramic materials of this invention improve the mechanical strength of the MIEC materials and are not significantly detrimental to their electrical properties. Second phases are structurally distinct from the MIEC phases. Second phases can include phases of the $AB_2O_4$ structure type, such as $SrAl_2O_4$, and the $A_2BO_4$ structure type, such as $Sr_2AlO_4$. More generally, second phases can include the quaternary and ternary phases (A, A')$_2$(B, B')O$_4$, A'$_2$(B, B')O$_4$, (A, A')(B, B')$_2$O$_4$, A'(B, B')$_2$O$_4$, A$_2$(B, B')O$_4$, A(B, B')$_2$O$_4$ and the mixed metal oxides $A_2BO_4$, $AB_2O_4$, $A_2B'O_4$, $AB'_2O_4$, $A'_2BO_4$, $A'B_2O_4$, $A'_2B'O_4$, and $A'B'_2O_4$, where A, A', B and B' are as defined above. In these formulas (A, A') and (B, B') are used to indicate all mixtures of the indicated elements. Presence of second phases can be detected using SEM or TEM methods. These methods and X-ray diffraction analysis can also be employed as known in the art to quantify the amount of second phase(s) present. Crystalline second phases can be detected by X-ray diffraction if they are present at levels of about 1 wt % or more. The amount of second phase detectable by X-ray diffraction depends upon the specific second phase or phases present. SEM and particularly TEM methods can typically be employed to quantify lower amounts of second phases.

Second phases can be added to the MIEC materials by any method. One method is to add the desired second phase or phases to a substantially single-phase MIEC material in powder form, and mix thoroughly to distribute the second phase homogeneously in the mixture prior to pressing and sintering membranes. Another method is to form the second phase or phases simultaneously with the formation of the desired membrane material by mixing an off-stoichiometric ratio of the starting materials.

BRIEF DESCRIPTION OF THE FIGURES

In the following figures, small arrows on the X-ray diffraction scans indicate peaks believed to be indicative of second phases. The shoulder peak at about 32 is believed to be due to $(Sr, La)_2(Al,Fe)O_4$. Additional peaks which may be observed from this phase are at 24, 42.5, 43.5, 54.5, 55.5, 65 and 76 (2θ) as seen in FIG. 5. The peaks between 28–30 are believed to be due to $Sr(Fe, Al)_2O_4$. Additionally, peaks from this phase which may be observed are at 20.2, 34.5 (2θ) as in FIG. 5.

FIGS. 6A and 6B are images prepared from different samples of the same materials indicating distribution of the La-deficient second phase throughout the material.

DETAILED DESCRIPTION OF THE INVENTION

Mixed ionic and electronic conducting (MIEC) membranes behave as short-circuited electrochemical cells, with appropriate catalysts applied for promoting each half reaction on their respective oxidizing and reducing surfaces. Ionic transport of $O^{2-}$ proceeds from reducing to oxidizing membrane surfaces with electrons mediating from oxidizing to reducing surfaces via the ceramic membrane.

A catalytic membrane reactor (CMR) has an oxidation zone and a reduction zone separated by a gas-impermeable membrane. The membrane surface in contact with the reduction zone is the reduction surface which optionally has a reduction catalyst layer. The membrane surface in contact with the oxidation zone is the oxidation surface which optionally has an oxidation catalyst layer. The reactor is provided with passageways for entrance and exit of gases from the reduction and oxidation zones. Multiple CMRs can be linked in series or in parallel (with respect to gas flows) for improved efficiency or speed of reaction.

A variety of CMRs are known in the art and can be employed in combination with the improved membranes of this invention. The improved mechanical properties of these membranes herein are particularly useful in systems employing tubular membranes and any other membrane structures or configurations that are subject to enhanced stresses during operation.

PCT application WO9/21649, filed Oct. 29, 1998, which is incorporated in its entirety herein by reference to the extent not inconsistent herewith, describes catalytic membrane reactors having a three dimensional catalyst within the reactor. Catalytic membranes of this invention can be employed in the reactor systems described therein. In a CMR, an oxygen-containing gas or gas mixture, such as air, is passed in contact with the membrane in the reduction zone, and the reactant gas or gas mixture, i.e., the oxygen-consuming gas, such as a reactant gas containing methane, is passed in contact with the membrane in the oxidation zone. As the oxygen-containing gas or gas mixture contacts the membrane, oxygen is reduced to oxygen anions which are transported through the membrane (as ions) to the membrane oxidation surface, facing the oxidation zone. In the oxidation zone, the oxygen anions react with the oxygen-consuming gas or gas mixture, oxidizing the oxygen-consuming gas and releasing electrons. The electrons return to the membrane reduction surface facing the reduction zone via transport through the membrane.

Membranes of CMRs are employed to form a gas-impermeable, yet ion and electron barrier, between the oxidation and reduction zones of the reactor. Membranes are typically mounted between the reactor zones employing a gas-impermeable sealant. A variety of methods and sealing materials are known in the art. U.S. provisional application 60/129,683, filed Apr. 16, 1999, provides improved sealant materials for use in CMRs having mixed metal oxide membranes. This provisional application is incorporated in its entirety by reference herein to the extent not inconsistent herewith.

The term "oxygen-containing gas" is used broadly herein to include gases and mixtures of gases in which at least one of the component gases is oxygen or an oxide. The oxygen or oxide component of the gas is capable of being reduced at the reduction surface of the membrane of this invention. The term includes carbon, nitrogen, and sulfur oxides ($CO_x$, $NO_x$ and $SO_x$) among others, and gas mixtures in which an oxide is a component, e.g. $NO_x$, in an inert gas or in another gas not reactive with the membrane. The term also includes mixtures of oxygen in other gases, e.g. $O_2$ in air. In the reactors of this invention, the oxygen-containing gas is passed in contact with the reduction surface of the membrane and the oxygen-containing component of the gas is at least partially reduced at the reduction surface, e.g., $NO_x$ to $N_2$. The gas passing out of the reduction zone of the reactor may contain residual oxygen or oxygen-containing component.

The term "reactant gas" is used broadly herein to refer to gases or mixtures of gases containing at least one component that is capable of being oxidized at the oxidation surface of a reactor of this invention. Reactant gas components include, but are not limited to methane, natural gas (whose major component is methane), gaseous hydrocarbons including light hydrocarbons (as this term is defined in the chemical arts), partially oxidized hydrocarbons such as methanol alcohols (ethanol, etc.) and organic environmental pollutants. Reactant gases include mixtures of reactant gas components, mixtures of such components with inert gases, or mixtures of such components with oxygen-containing species, such as CO, $CO_2$ or $H_2O$. The term "oxygen-consuming gas" may also be used herein to describe a reactant gas that reacts with oxygen anions generated at the oxidizing surface of the membrane. Reactant gas also includes gases with suspended or entrained particles, such as carbon particles slurried in water vapor.

The term "oxygen-depleted gas" refers to a gas or gas mixture from which oxygen has been separated by passage through a reactor of this invention (i.e., the residual of the oxygen-containing gas). The term "sweep gas" refers to a gas or gas mixture that is introduced into the oxidation zone of a reactor used for oxygen separation to carry the separated oxygen. The sweep gas may be an inert gas, air or other non-reactive gas that substantially does not contain components that will be oxidized in the oxidation zone of the reactor. The sweep gas can be applied to mixtures containing some oxygen, such as air, the oxygen content of which will be increased by passage through the oxidation zone of the reactor.

The term "partial vacuum" applies to the application of a partial vacuum, i.e., less than ambient pressure, to the oxidation zone of a reactor and may refer to high or low vacuum depending upon the construction of the reactor. Application of a partial vacuum to the oxidation zone of a reactor used for oxygen separation can be employed to collect gases for ultimate concentration of the separated oxygen. Gases in the oxidation or reduction zones of the CMR can be at ambient pressure or at pressures higher or lower than ambient.

The terms "reactant gas," "oxygen-depleted gas," "oxygen-consuming gas," and "oxygen-containing gas" and any other gas mixture discussed herein include materials which are not gases at temperatures below the temperature ranges of the pertinent process of the present invention or at pressures of the CMR, and may include materials which are liquid or solid at room temperature. An example of an oxygen-containing gas which is liquid at room temperature is steam.

The term "gas-impermeable" as applied to membranes of this invention means that the membrane is substantially impervious to the passage of oxygen-containing or reactant gases in the reactor. Minor amounts of transport of gases across the membrane may occur without detriment to the efficiency of the reactor. It may be that membranes of this invention will allow passage of low molecular weight gases such as $H_2$. The membranes of this invention conduct oxygen anions and in this sense are permeable to oxygen.

The membrane materials of this invention are mixed phase ceramics. In a crystalline single-phase material, the elements combine in a well-ordered array. The presence of a single-phase can be assessed by XRD or similar known techniques of phase identification (scanning electron microscopy (SEM) or transmission electron microscopy (TEM)). A mixed phase material contains one or more distinct crystalline phases. In the mixed phase materials of this invention, the predominant phase is a material that exhibits both ionic and electronic conductivity (MIEC). The second phase or phases present enhance the mechanical strength of the mixed phase material. Exemplary second phases are mixed metal oxides distinguishable in structure from the predominant MIEC phase. The presence and amounts of second phases in the mixed phase materials of this invention can be assessed by X-ray diffraction or by SEM or TEM techniques.

MIEC phases of this invention more specifically include those of formula:

$$La_xSr_{2-x}B_yB'_{2-y}O_{5+z},$$

where x, x', y, y', z, B and B' are as defined above, with B more preferably Ga or Al, and B' more preferably Fe. Preferred materials have 0.05<x<1.0 and 0.25<y<1.2. More preferred materials have 0.20<x<0.6 and 0.30<y<1.0. Second phases that are combined with these specific MIEC include Sr $(B,B')_2O_4$ and $Sr_2(B,B')O_4$.

In the mixed metal oxides of this invention, Group 2 elements Mg, Ca, Sr, Ba and Ra are believed to be in the 2+ oxidation state. Group 3 elements Al, Ga, and In are believed to be in the 3+ oxidation state. Lanthanides (including lanthanum and yttrium) are believed to be in the 3+ oxidation state. The transition metals in these materials are expected to be of mixed valence (i.e., a mixture of oxidation states) dependent upon the amount of oxygen present and the temperature.

Mixed phase materials of this invention can be prepared by combining starting materials in off-stoichiometric ratios. The term "stoichiometric" refers to the relative amounts of starting metal compounds (e.g., metal oxides or carbonates) combined to obtain a mixed metal oxide of a given formula. Stoichiometric mixing provides the component metals in the correct relative molar amounts according to the mixed metal oxide formula (e.g., $A_xA'_{x'}\cdot A''_{2-x-x'}B_yB'_{y'}B''_{2-y-y'}O_{5+z}$).

The term "off-stoichiometric" refers to the relative amounts of starting materials combined to be somewhat off (i.e., higher or lower) of those required for the formula of the desired MIEC phase.

One or more of the starting components are present in a higher or lower amount than required to obtain the desired stoichiometry of the MIEC phase.

Examples of processes which may be conducted in CMRs using MIEC membranes include the combustion of hydrogen to produce water, the partial oxidation of methane, natural gas or other light hydrocarbons to produce unsaturated compounds or synthesis gas, the partial oxidation of ethane, extraction of oxygen from oxygen-containing gases, e.g., extraction of oxygen from: $NO_x$, wherein x has a value from 0.5 to 2; $SO_y$, wherein y has a value from 2 to 3, steam, or $CO_2$; ammoxidation of methane to hydrogen cyanide, and oxidation of $H_2S$ to produce $H_2O$ and S.

The partial oxidation of methane and other hydrocarbons to produce synthesis gas is a spontaneous process to produce either a high value fuel or a feedstream for high value chemicals. This process can be carried out in the presence of $CO_2$ and steam. When these ceramic materials are used for the partial oxidation of methane to produce syngas, the reaction can be written:

$$CH_4 + \tfrac{1}{2}O_2 \rightarrow CO + 2H_2$$

Coal gasification also produces syngas, but by the combination of steam reforming and partial oxidation of carbon. In this case, the reactant gas can be a slurry of carbon particles in steam. The overall reaction for this process can be written:

$$2C + \tfrac{1}{2}O_2 + H_2O \rightarrow 2CO + H_2$$

A further reaction that can be conducted with CMR is the oxydehydration reaction of ethane, according to the reaction:

$$C_2H_6 + \tfrac{1}{2}O_2 \rightarrow C_2H_4 + H_2O$$

Coupling reactions can also be facilitated by these membranes. One example is the coupling of methane to form ethane or ethylene, or of methane and ethane to form propane, and higher alkanes and alkenes. The coupling of toluene ($C_6H_5CH_3$) to form stilbene ($C_6H_5CH=CHC_6H_5$), as an intermediate in the formation of benzoic acid, can also be carried out using these membranes.

Partial oxidation and coupling reactions of CRMs can employ unsaturated and saturated linear, branched, and cyclic hydrocarbons, partially oxidized hydrocarbons, as well as aromatic hydrocarbons as reactants. Specific examples include methane, ethane, ethylene, propane, etc., cyclopropane, cyclobutane, cyclopentane, cyclopentene, etc., isobutane, isobutene, methylpentane, etc., and benzene, ethylbenzene, napthalene, methanol, ethanol, etc. Products of reactions with these various hydrocarbon species will generally depend upon the types of oxidation and or reduction catalysts on the membrane surfaces.

All of the listed examples make use of pure oxygen as a reactant. CMRs may also be used for the separation and production of high purity oxygen. Because these reactions make use of pure oxygen separated from the air by the mixed conducting membrane, there is no nitrogen present, and hence no $NO_x$ compounds are generated. The formation of the products acts a driving force for the permeation of oxygen through the ceramic membrane, as the reaction of oxygen maintains a very low partial pressure of oxygen on the product side. Particularly in the case of coupling reactions, selection of catalysts for the oxidation and/or the reduction surface of the membranes is important to improve production with optimal selectivity.

Another type of process suitable for CMRs, is the reaction of an oxygen-containing gas which is capable of losing oxygen, for example, NO, $NO_2$, $SO_2$, $SO_3$, CO, $CO_2$, etc. The oxidation zone of the reactor is exposed to a partial vacuum, an inert gas, or a gas that will react with oxygen (e.g., various hydrocarbons). Effective ranges of partial vacuum are from approximately 100 Torr to $10_{-6}$ Torr. An example is where the reactant gas is methane, natural gas, or hydrogen and the oxygen-containing gas is a flue or exhaust gas containing $NO_x$, and or $SO_y$, wherein x is 0.5 to 2 and y is 2 to 3. As the flue gas contacts the membrane, any oxygen present or the oxygen in $NO_y$ and/or $SO_y$ is reduced to oxygen anions which are transported through the membrane to the oxidation zone where the oxygen anions react with the oxygen-consuming gas to produce carbon dioxide and water, synthesis gas or olefins, depending on the reaction conditions. Nitrogen gas and elemental sulfur are produced from $NO_x$ and $SO_y$ respectively, in the reduction zone.

In another type of CMR reaction, the oxygen-containing gas is a gas-containing steam (i.e., $H_2O$ gas). As $H_2O$ contacts the membrane, the oxygen of $H_2O$ is reduced to oxygen anions which are transported through the membrane to the oxidation zone where the oxygen anions react with methane or natural gas, for example. The $H_2O$ is reduced to hydrogen gas ($H_2$) in the reduction zone. The hydrogen gas may be recovered and used, for example, to hydrogenate unsaturated hydrocarbons, provide fuel for an electrical current generating fuel cell, to provide fuel for heating the catalytic membrane reactor of this invention or to provide reactant gas for the process for extracting oxygen from an oxygen-containing gas in accordance with the present invention.

Materials which are co-present in any reactor feed gases may participate in catalytic membrane reduction or oxidation taking place at the membrane of the present invention. When, for example, methane is present with ammonia in the oxidation zone and an oxygen-containing gas is present in the reduction zone, hydrogen cyanide and water can be produced in the oxidation zone. Reactors of the present invention can also be applied to the oxidative reforming of $CO_2/CH_4$ mixtures to synthesis gas. Other combinations of materials reactive with each other in CMRs to produce a wide range of products are possible and are contemplated as being within the scope of the invention.

Optional Catalysts

It has been found that certain catalysts may be used to significantly enhance the efficiency of the reaction being mediated by the membrane. Catalysts to be used are specific to each reaction. For example, in the partial oxidation of methane, natural gas, or light hydrocarbons to synthesis gas, the catalyst must be able to dissociatively adsorb the hydrocarbon species, followed by oxygen atom transfer to the dissociatively adsorbed residue. The first requirement is met with catalysts possessing considerable hydrogen affinity (e.g. surface hydride forming ability or surface basicity). Oxygen atom transfer to the residue implies that the catalyst possesses only modest metal-oxygen binding energy and is reversibly reducible. Catalysts possessing these features include the platinum group metals Ni, Pd, Pt, Rh, Ru, Ir, and Os, as well as the first row transition metals Fe, Mn, and Co. Incorporation of these metals or their combinations onto the oxidation surface of oxygen anion conducting membranes provides a strategy for direct partial oxidation of hydrocarbons. Moderation of catalyst activity to avoid coke formation is achieved by the incorporation of metal clusters into ceramics such as $CeO_2$, $Bi_2O_3$, $ZrO_2$, $CaB_{1-x}B'_xO_3$, $SrB_{1-x}B'_xO_3$ or $BaB_{1-x}B'_xO_3$ (where B=4+-lanthanide ion such as Ce, Tb, or Pr; B'=3+-lanthanide ion such as Gd or Nd; and $0<x<0.2$). Additionally, incorporation of transition metal ions into the B-site of a perovskite, with a basic A-site, will give an active catalyst since the bonding of the metal ion to oxygen will be correspondingly weakened and the oxygen atom transfer activity of the metal ion enhanced. Perovskites possess the general formula $A_{1-x}A_x'B_{1-y}B_y'O_3$ (where A=lanthanide metal ion or Y; A'=alkali or alkaline earth cation and $0<x<0.8$; B=transition metal ion such as Fe, Ni, or Co; B'=Ce or Cu, Ag, Au or Pt, Pd, or Ni and $0<y<0.3$).

For the reductive decomposition of $NO_x$ and $SO_x$, as well as for oxygen concentration, perovskites are again favored catalysts. In $NO_x$ decomposition, the catalyst must preferentially adsorb $NO_x$ over $O_2$ and permit the facile release of adsorbed O atoms. The first requirement is met by the use of the first row transition metal ions including Fe, Co, Ni, and Cu, as well as by group VIII metals such as Ru, Pt, or Pd in the B-site. The second requirement is met by the employment of basic or low melting metals in the A-site (Pb, Bi, or Sb, lanthanides or Group IA and IIA dopants) as well as by the use of Ru or Group IB metals (Ag or Au) as a B-site dopant. These conditions are expected to produce generally weak M-O bonds, permitting the required surface and bulk mobility of oxygen ions. In addition, catalysts such as transition metals (Cu, Ag, Au, Pd, Pt, Rh, Ir, Os) supported on metal oxides, (e.g. $Fe_2O_3$, $Co_2O_3$, $Fe_3O_4$, NiO, $Ni_2O_3$, MnO, $MnO_2$) and prepared by various method such as coprecipitation, impregnation, etc., are expected to be active.

$SO_x$ decomposition may be promoted in a similar manner to $NO_x$ decomposition, but the issue of sulfur tolerance arises. In that case, materials based on the Group VIB metals (Cr, Mo, and W) such as $WS_2$ or WC or on the Group VIII metals (Fe, Co, Ni, and Cu) such as the thioperovskites $ABS_3$ (where A is a lanthanide and B is a Group VIII metal), thiospinels $AB_2S_4$ (where A is a $2^+$ Group VIII ion and B is a $3^+$ Group VIII ion) or Chevrel phases $A_2Mo_6S_8$ (where A is Fe, Co, Ni, Cu, Zn) are applicable. Similar requirements for oxygen reduction as for $NO_x$ reduction point to the use of similar perovskite catalysts.

$H_2S$ decomposition is similar to that of $SO_x$ decomposition. The preferred catalysts for this process are thiospinels $AB_2S_4$ (where A is a $2^-$ Group VIII ion and B is a $3^+$ Group VIII ion) or $WS_2$.

Previous work examining oxygen desorption using Temperature Programmed Desorption (TPD) from perovskite oxides has shown that two types of oxygen can become desorbed (Y. Teraoka, H.-M. Zhang and N. Yamazoe, Chem. Lett. 1367 (1955)). Here oxygen desorbed at lower temperatures, termed α oxygen, corresponds to adsorbed surface oxygen, and that desorbed at higher temperatures, designated β oxygen, is desorbed from lattice sites within the perovskite. TPD studies on oxygen desorption from perovskite oxides have been studied as a function of the nature and concentration of dopant atoms introduced into both the A- and B-sites. A brief discussion of some of these results and their relevance to selection of perovskite sites for oxygen evolution at intermediate temperatures is presented below.

TPD studies of oxygen evolution from perovskite oxides has shown the amount of α-oxygen desorbed from $Ln_{1-x}A_xMO_3$ (Ln is a lanthanide, A is an alkaline earth metal, and M is Co, Fe Ni Cr) was a function of x and hence the vacancy concentration and was little affected by the nature of the B-site. These results suggested that β-oxygen occupied normally empty oxygen vacancy sites. The onset temperature where β-oxygen evolved was found to increase upon going from Ba to Sr to Ca in the A lattice site. Calculation of the average metal oxygen bond energy for the series $La_{1-x}A_xCoO_3$ (A is Ba, Sr and Ca) using the equation:

$$ABE = \frac{1}{12 \cdot m}\left(\Delta H_{A_mO_n} - m\Delta H_A - \frac{1}{n}D_{(O_2)}\right) + \frac{1}{6 \cdot m}(\Delta H_{B_mO_n} - m\Delta H_B)$$

where $\Delta HA_m{}^O{}_n$ and $\Delta HA_m{}^O{}_n$ are the heats of formation of the $A_mO_n$ and $B_mO_n$ oxides, respectively, $\Delta H_A$ and $\Delta H_B$ the heats of sublimation of the metals A and B, respectively, and $D_{(O_2)}$ is the oxygen dissociation energy, shows that the average metal-oxygen bond energy decreases in the order $La_{1-x}Ca_xCoO_3$, $La_{1-x}Sr_xCoO_3$, $La_{1-x}Ba_xCoO_3$. Thus, the α-oxygen desorption temperature is dependent on the average metal-oxygen bond strength at the perovskite surface. β-oxygen desorption is due to removal of oxygen from normal lattice sites accompanied by reduction of the formal B site oxidation cation by one. More recent work has shown that partial substitution of the B-site cation in $La_{0.6}Sr_{0.04}Co_{0.8}M_{0.2}O_3$ with Cr Mn, Fe, Ni, Ni and Cu affects both the onset temperature for and the amount of α-oxygen evolved. The amount of α-oxygen evolved decreased in the order Cu>Fe>Ni>Mn>Cr. (Y. Teraoka, T. Nobunaya, N. Yamazoe, Chem. Lett. 503 (1988).)

Good oxygen evolution catalyst sites can occur when using perovskites possessing the general composition $BaCo_{1-x}M_xO_3$, where M is Fe, Cu or Ag and x is a number from 0 to 1. For these compositions the vacancy concentration has been maximized by total replacement of the $Ln^{3+}$ cation by the alkaline earth cation $Ba^{2+}$. Previous work (M. Crespin and K. W. Hall, J. Cat. 69, 359 (1981)) suggests that water decomposition at perovskite surfaces proceeds via reaction with oxygen vacancies. Additionally, selection of Ba over Sr or Ca leads to lower average metal-oxygen bond strengths and B site doping with Fe, Cu or Ag has been previously shown to enhance oxygen desorption.

As a consequence, perovskite electrocatalysts of formula $BaCo_{1-x}M_xO_3$, where M is Fe, Cu or Ag ($0.05 \leq x \leq 0.2$) are of significant interest for catalytic reactors of this invention. The predominance of Co in the B lattice site is compatible with both the oxygen dissociative adsorption and oxygen evolution step. Introduction of Fe, Cu and Ag into this lattice site will contribute to low overpotentials associated with the oxygen evolution reaction.

Metal oxide supported Ni can be employed on a membrane of this invention as a catalyst for $CO_2/CH_4$ oxidative reforming to synthesis gas. The Ni:support ratio in these catalysts can vary from about 5:100 (5%) to about 100% Ni. Preferred, Ni:support ratios are from about 1:10 (10% Ni) to 4:10 (40% Ni). Supports employed include inert supports (such as $\gamma$-$Al_2O_3$) and ionic and electronic conductors. Supports having Cr and Mn ions are expected to promote $CO_2$ absorption facilitating the reforming reaction. A preferred catalyst is Ni supported LSM. In addition, supports based on substitution of Cr and Mn into the metal oxide structure $La_{0.4}Sr_{1.6}GaFeO_{5.2}$ are useful as catalyst supports in this system.

Catalysts for hydrocarbon coupling include, but are not limited to, perovskite electrocatalysts. These catalysts generally have a transition metal on the B site of the $ABO_3$ perovskite structures. The A site is occupied by two different f/l-block elements or IA elements. Examples are $Sm_{0.5}Ce_{0.5}CuO_3$, $Tb_{0.8}Sm_{0.2}CuO_3$, $Gd_{0.9}Th_{0.1}CuO_3$, $Gd_{0.9}Na_{0.1}MnO_3$, and $Tb_{0.8}Yb_{0.2}NiO_3$ (Kuchynka, D. J. et al. (1991) J. Electrochem. Soc. 138:1284).

Membranes useful in the CMRs of this invention can be dense, gas-impermeable sintered materials in any desired shape, including membrane disks, flat plates, open tubes, closed-one-end tubes, etc., which can be adapted to form a gas-tight seal between the two reactor zones or chambers of CMRs. Membranes can be composed substantially of the mixed phase ceramic material described herein or can be composed of porous substrate with a gas-impermeable thin film of the mixed phase ceramic material described herein.

Membranes can be formed by, isostatic pressing of mixed metal oxide materials of this invention into dense substantially gas impermeably membranes. Alternatively, substantially gas-impermeable membranes can be formed by forming dense thin films of ionically and electronically conducting mixed metal oxide on porous substrate materials. Again these two component membranes (porous substrate and dense thin film can have any desired shape including disks, tubes or closed-one-ended tubes. Porous substrates (which allow passage of gas through the substrate) can include various metal oxide materials including metal-oxide stabilized zirconia, titania, alumina, magnesia, or silica, mixed metal oxide materials exhibiting ion and/or electronic conduction or metal alloys, particularly those that minimally react with oxygen. The substrate material should be inert to oxygen or facilitate the desired transport of oxygen. More preferred substrates are those that have a thermal expansion coefficient (over the operational temperatures of the reactor) that is matched to that of the mixed metal oxide ion/electron conducting material.

Thin films (about 1–300 $\mu$m thick) of the mixed metal oxides of this invention are formed on the porous substrate by a variety of techniques, including tape casting, dip coating or spin coating. A presently-preferred two component membrane is prepared by forming dense thin films of the mixed metal oxides of this invention on a porous substrate formed from the same mixed metal oxide material.

In operation, the ceramic membranes are subjected to several stresses. Reactor design can minimize these stresses. In the use of tubular ceramic membranes, for example, which are supported on alumina tubes, gastight seals must be formed which accommodate the thermal expansion mismatch of the dissimilar reactor components. Chemical expansion also creates stresses which must be minimized. Again, using tubular ceramic membranes as an example, gas flows for the conversion of methane to synthesis gas are designed to flow air through the inner length of the tube, with methane flowing over the outside surface of the tube. Reversing the gas flows can cause the membrane tubes to burst. This effect is related to the chemical expansion of the materials under oxidizing and reducing atmospheres.

Ceramic metal oxides heated in air are generally chemically reduced. The loss of oxygen from the lattice causes an expansion in the unit cell. The loss of oxygen, and hence the chemical expansion, is modified by heating under either more oxidizing or reducing gases. When opposite sides of a membrane are heated under different atmospheres (different gases which may be at different pressures), a gradient of oxygen occupancy can exist through the membrane thickness. Hence, the stresses due to chemical expansion vary through the thickness of the membrane.

Stresses on tubular membranes are particularly significant. As a tubular shaped piece expands radially, the volume expansion on the outer region is greater than that of the inner region. This follows the lattice expansion caused by gas flows set up with oxidizing air flowing through the center of the tube, and methane, or reducing gases, flowing over the outer surface, as in the reactor conditions described above. If the gaseous atmospheres were switched, the tubes would regularly burst from the excessive tensile stresses caused by the large volume increase on the inner portion of the tube.

Two inherent difficulties associated with applications of ceramic materials in CMRs are the chemical inhomogeneity of the mixed conducting metal oxides exposed to oxidizing and reducing gases, and the brittle nature common to ceramics, which generally exhibit low strength in tension. This invention is based at least in part on the discovery that the addition of a second phase can increase the mechanical strength of membranes made from brownmillerite-derived MIECs. The increased strength reduces breakage and cracking from handling and cutting associated with preparation of membranes for reactor setup. It also reduces breakage associated with thermal and chemical shock to which they are exposed under typical CMR operating conditions.

There are several examples of improved properties on introduction of second phases in metal alloys or metal oxides. Second phases can improve corrosion resistance, as observed in magnesium metal alloys (U.S. Pat. No. 5,139,077), act as a sintering aid by lowering sintering temperature through reactive sintering (U.S. Pat. No. 4,848,984) or by increasing densification, or increase strength, as MgO in $\beta$-alumina (U.S. Pat. No. 3,535,163).

Substantially single-phase material with analytically observable levels of second phases are prepared in a manner similar to the preparation of single-phase material, except that additional amounts of starting materials are needed to compensate for losses of volatile impurities are not added. Alternatively, an off-stoichiometric amount of these starting materials than that prescribed by the desired stoichiometry of the MIEC phase can be added to the other components. Somewhat more or less off-stoichiometric mixing causes more of the second phases to form. Materials having up to about 10% by weight of second phases have been prepared by this method. Second phases (or higher levels of second phases) have also been observed when the combined powders are inefficiently mixed prior to calcination.

A variety of methods are known in the art for the preparation of mixed oxide crystalline phases which can be used to prepare materials of this invention including, for example, sol-gel techniques and the glycine-nitrate combustion methods (See: M. N. Rahaman (1995) Ceramic Processing and Sintering, Marcel-Dekker, N. Y.; and L. A. Chick et al. (1990) Mater. Lett. 10:6).

The second phases observed most frequently are metal oxides which can be characterized in two different structure types: $AB_2O_4$ and $A_2BO_4$. In these structures, Sr and La are mixed in the A-site, and the B-site is occupied by Fe and either Al or Ga. The precise ratio of the cations on each site is not analytically known. Identifying peaks for the Sr (Al, Fe)$_2$O$_4$ phase are three small peaks between 28 and 30° 2θ, while the K$_2$NiF$_4$ phase (Sr, La)$_2$ (Al,Fe)O$_4$ shows a characteristic peak found just left of the largest peak from the desired single-phase metal oxide phase (about 31–32° 2θ)

Two common types of second phases used in these membranes are not ionic or electronic conductors (AB$_2$O$_4$ and A$_2$BO$_4$). These phases are of the BaAl$_2$O$_4$ structure type, and the K$_2$NiF$_4$ structure type. The latter is the n=1 member of the Ruddlesden-Popper type structures AO. (ABO$_3$)$_n$, where perovskitic layers alternate with rock-salt type layers. These, and other intergrowth type structures are at best poor ionic conductors, as ionic conductivity is often restricted to two dimensions. As supporting second phases, though, they improve the mechanical strength of the brownmillerite-derived materials, and are not detrimental to their electrical properties.

EXAMPLES

Example 1

General Preparation of Membranes from Single-Phase and Mixed-Phase Mixed Metal Oxides Starting materials for preparation of mixed metal oxides are obtained from commercial sources and typically are employed without further purification. For specific examples below, La$_2$O$_3$, SrCO$_3$, Ga$_2$O$_3$, and Al$_2$O$_3$ are obtained from Alfa/Aesar at purities indicated below. Fe$_2$O$_3$ was obtained from Aldrich. A Loss on Ignition test (LOI) is performed on the above reagents to determine the amount of volatile compounds, (i.e., water, or CO$_2$) which are absorbed on the powders. For the SrCO$_3$ used LOIs range from 1.7 to 2.0% by weight. La$_2$O$_3$ is found to have LOIs ranging from 0.9 to 9.8% by weight. The other materials are found to have negligible LOIs. The LOI of a material received from a given supplier will generally vary with batch or lot and must be redetermined when a new batch or lot is employed. The LOI of material received in an individual shipment typically remained constant throughout the shelf life (several months) of that container in the laboratory. Exposure of starting materials to humid conditions may affect LOI.

The mixed metal oxide ceramic materials of this invention are, in general, prepared from powders using standard solid state synthesis techniques. All compounds are prepared from mixtures of the appropriate metal oxide(s) and metal carbonate(s) in amounts as indicated below. Powders are placed in a small polyethylene container with an equal amount, by volume, of isopropyl alcohol. Several cylindrical yttria-stabilized zirconia (YSZ) grinding media are also added to the container. The resulting slurry was mixed thoroughly on a ball mill for several hours. The alcohol is then allowed to evaporate yielding a homogeneous mixture of the starting materials. This homogeneous mixture is calcined to obtain the desired predominant MIEC phase. Powders are placed in alumina crucibles and fired at temperatures of 1100° C. to 1450° C. for 12 h in atmosphere. Upon cooling, the powders are sieved to 45 mesh size . Calcining is repeated if necessary (typically twice) until a consistent X-ray diffraction pattern indicates that reaction has gone to completion. XRD is performed using a Philips PW1830 X-ray generator with model 1050 goniometer for powder samples with a PW3710 control unit.

Before pressing and sintering, the particle size of the powders is reduced by attrition. A Union Process Model 01 attritor with a YSZ tank and YSZ agitator arms is used for this process. In a typical attrition, about 1.5 lbs of 5 mm, spherical YSZ grinding media are placed in the tank. Isopropyl alcohol (about 120 mL) is then added to the tank followed by about 100 g of the powder sieved to −45 mesh. The powder's particle size is reduced by attrition for 1 h, after which the alcohol is allowed to evaporate. XRD on the powder indicates that the attrition procedure does not cause decomposition. No decomposition is observed for any materials. The XRD patterns show considerable peak broadening, indicative of small particles. The particle size at this stage is believed to be submicron to several micron (e.g., 0.7–2 micron).

Membrane materials can be shaped into disks, plates, tubes, closed-one-end tubes or other useful shapes by isostatic pressing using appropriately shaped molds . For example, a commercial isostatic press (Fluition CP2-10-60) can be employed to form closed-one-end tube membranes. This press is capable of operation to 54,000 psi to form tubes of ~4 cm outer diameter and 10 cm in length. Powder is prepared and reduced in particle size as discussed above. A PVB (polyvinyl butyral) binder is added to the powder. A rubber mold is fabricated in the desired outer shape of the tube. A small amount of powder sufficient to form the top end of the closed-one-end tube is introduced into the mold. A mandrel having the shape of the inner surface of the tube is then inserted into the mold. A plug funnel is inserted into the top of the mold to allow powder to be added evenly around the mandrel. In particular, the funnel employed is designed so that it fits over the end of the mandrel and centers the mandrel in the mold. Powder is then poured into the mold via the funnel with vibration to ensure even packing. The mold is inserted into the press. Pressure of 15,000 psi to about 30,000 psi is applied to the mold for about 2 min. After pressurization, the mold is removed and the green tube is removed from the mold. Very high green densities up to 80%, as measured by the Archimedes method, can be obtained.

Green closed-one-end tubes are sintered by placing the tubes horizontally in a crucible with zirconia powder or setter of similar composition as the membrane. XRD of the tube surface after sintering indicated that no reaction had occurred between the setter and the tube. Straight closed-end tubes of sintered density typically between about 90% to 95% can be prepared using this method. Tubes with wall thicknesses ranging from about 0.5 mm to about 1.5 mm can be made by this method.

Membrane disks were formed by mixing the powder with a binder, e.g. a standard ceramic binder, such as Ceracer C640 (Shamrock), which is a polyethylene wax, with a mortar and pestle until a homogeneous mixture was obtained. Another suitable ceramic binder is methylcellulose. The binder/powder mixture (about 1 g) was placed in a 12.5 mm diameter die. The mixture was then pressed into disks at 15,000 psi for several minutes. These "green" disks were then placed into an Al$_2$O$_3$ crucible for sintering. Disks were packed with powder of the same material to ensure that the disks did not react with the crucible or sinter together. Disks were sintered in the crucible in atmosphere for 4 h at the appropriate sintering temperature for a given material from about 1300° C. to about 1450° C. to obtain sintered disks preferably of ≦90% theoretical density. Sintering temperature for a given material was determined empirically as is known in the art. Typical ramp rates during sintering were 3° C./min for both heating and cooling cycles.

Example 2

Preparation of a Single-Phase MIEC

La$_{0.3}$Sr$_{1.7}$Ga$_{0.6}$Fe$_{1.4}$O$_{5+z}$ was prepared by combining the following:

13.81 g of $La_2O_3$ (99.9% purity by weight on a rare earth metals basis)

65.02 g of $SrCO_3$ (99% purity by weight, with <1% Ba)

28.44 g of $Fe_2O_3$ (99+% purity by weight)

14:31 g of $Ga_2O_3$ (99.99% purity by weight on a metals basis)

in propanol and followed by ball milling for 18–24 hours, after which the milled powder was dried and calcined in an alumina crucible (in air) for 6–12 h at 1175° C.–1250° C. In this procedure, additional amounts of $SrCO_3$ (1.17 g) and $La_2O_3$ (1.35 g) over the calculated amounts required to achieve the desired formula stoichiometry were added to the initial mixture to compensate for the volatile mass that would be lost before and during the solid state reactions, such that the final metal composition after reaction is the same as the nominal composition listed in the above formula. LOI for $SrCO_3$ and $La_2O_3$ starting materials were 1.8% and 9.8%, respectively. The resulting product was subjected to grinding and sieving before calcining a second time at 1175° C.–1250° C. for 6–12 hours to complete reaction giving a homogeneous single phase powder.

Figure 1:
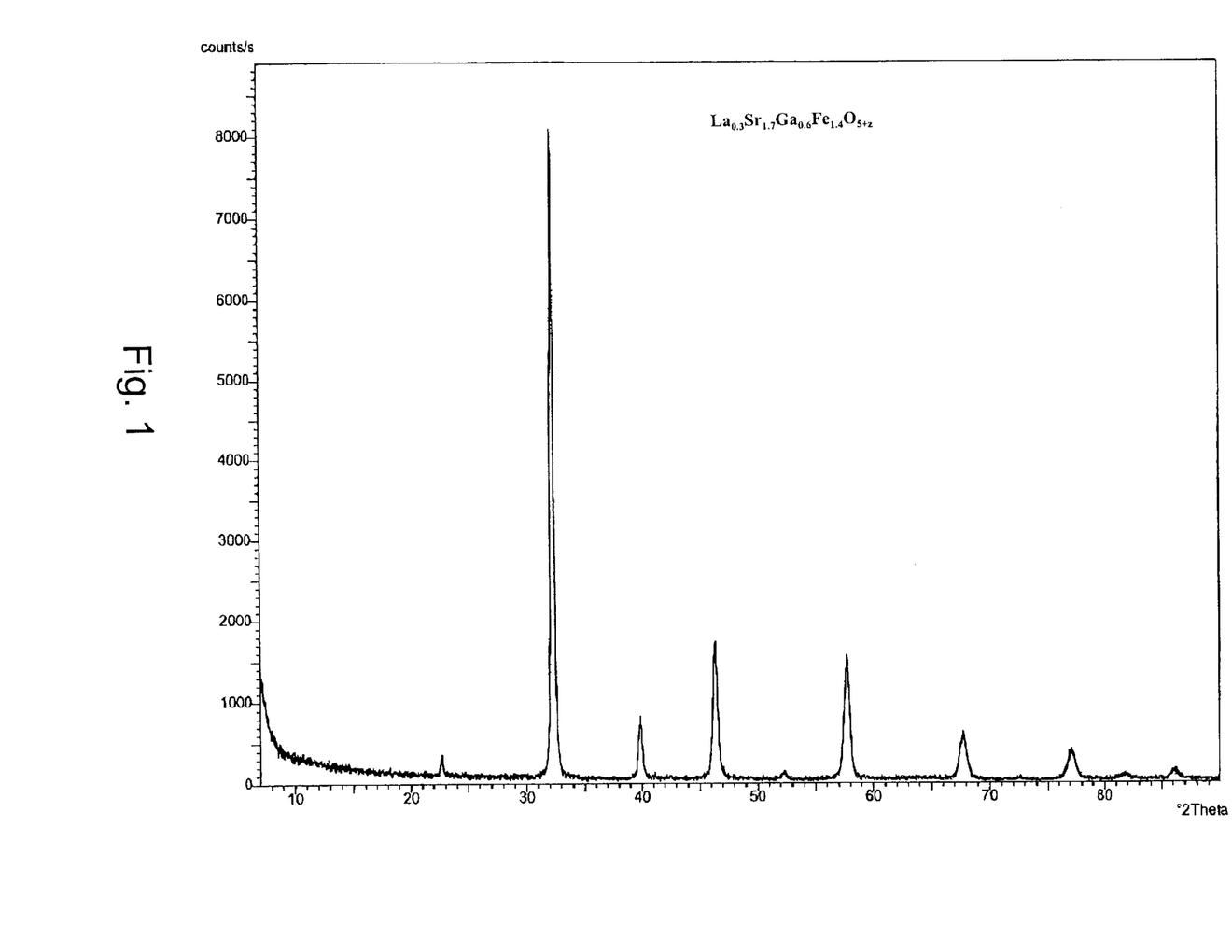
FIG. 1 is an X-ray diffraction scan of the MIEC material of Example 2 which is shown to be single-phase $La_{0.3}Sr_{1.7}Ga_{0.6}Fe_{1.4}O_{5+z}$.

To prepare dense membranes, the resulting powders were mixed with polyvinyl butyral binder 2–3 wt %, but not more than 5 wt %, pressed closed and sintered in air at 1150° C.–1450° C. for 4–12 hours into dense disks and dense close-one-end tubes. Materials containing Ga are preferably sintered at lower temperatures in this range. X-ray diffraction of sintered membranes of $La_{0.3}Sr_{1.7}Ga_{0.6}Fe_{1.4}O_{5+z}$ prepared in this manner, with addition of increased amounts of $SrCO_3$ and $La_2O_3$ to compensate for losses of volatile impurities, show the material to be single-phase, with less than about 1 wt % of second phase as shown in the XRD of FIG. 1.

Example 3

$La_{0.3}Sr_{1.7}Ga_{0.6}Fe_{1.4}O_{5+z}$, was prepared as in Example 2 above combining the following starting materials of the same purity and source:

1.246 parts by wt. of $La_2O_3$ (12.46 g)

6.385 parts by wt. of $SrCO_3$ (63.3 g) 2.844 parts by wt. of $Fe_2O_3$ (28.44 g) 1.431 parts by wt. of $Ga_2O_3$ (14.31 g)

Figure 2:
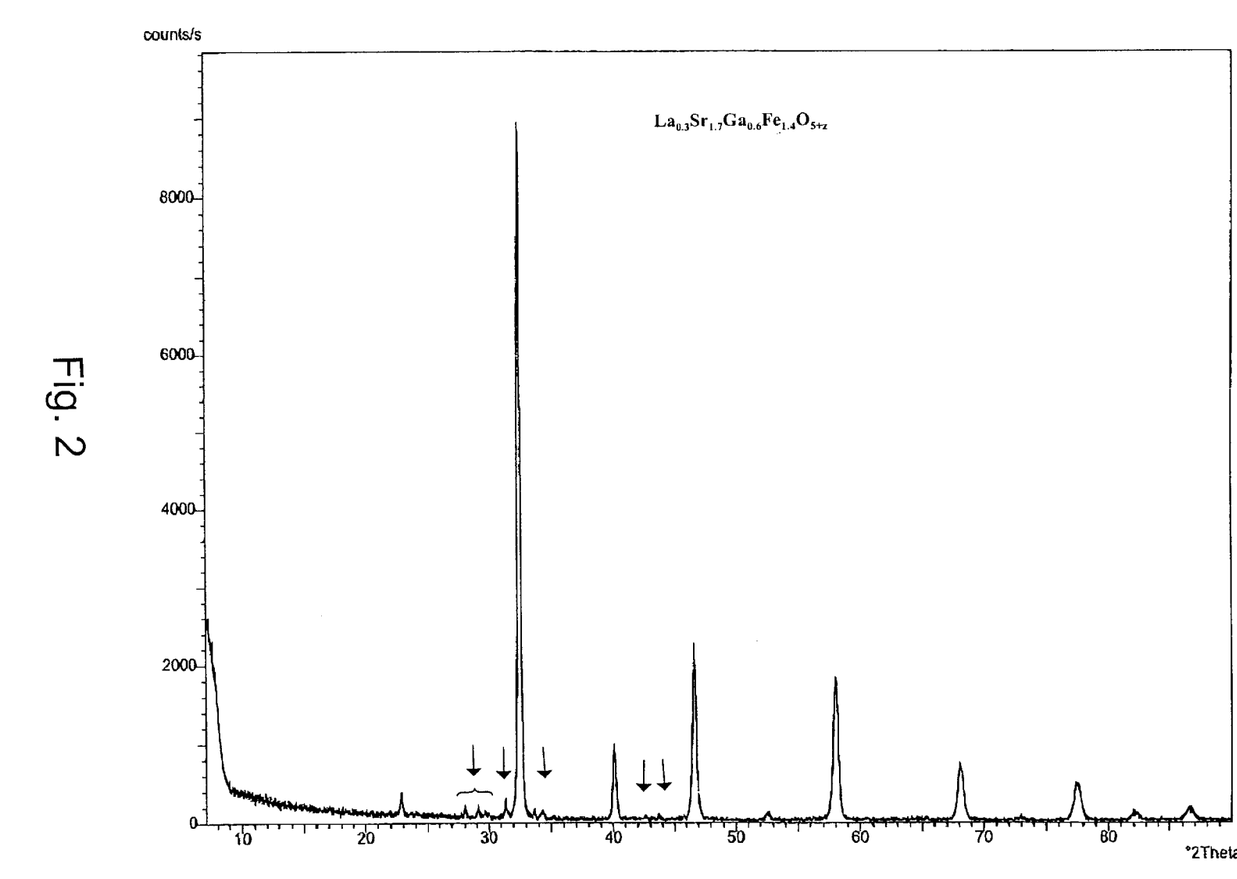
FIG. 2 is an X-ray diffraction scan of the mixed phase membrane material of Example 3 which is a mixed phase material containing the $La_{0.3}Sr_{1.7}Ga_{0.6}Fe_{1.4}O_{5+z}$ MIEC phase and about 2–4 wt % of second phase(s).

In this case no adjustments were made for the LOI correction. Membranes were prepared as in Example 2 above. An X-ray diffraction pattern of this membrane material is provided in FIG. 2. Based on the LOI determination, the composition made was about 2.5% off of stoichiometric. Peaks in the regions about 28–31° C. 2θ and peaks at about 34 and 43 indicate the presence of second phases in addition to the predominant component $La_{0.3}Sr_{1.7}Ga_{0.6}Fe_{1.4}O_{5+z}$. Based on the XRD the second phase represents about 2–4 wt % of the membrane.

Example 4

$La_{0.3}Sr_{1.7}Al_{0.6}Fe_{1.4}O_{5+z}$ was prepared as in B above combining the following starting materials of the same purity and source:

1.330 parts by wt. of $La_2O_3$ (13.30 g)

6.831 parts by wt. of $SrCO_3$ (68.31 g)

3.043 parts by wt. of $Fe_2O_3$ (30.43 g)

0.833 parts by wt. of $Al_2O_3$ (99.99% purity by weight on a metals basis) (8.33 g)

Figure 3:
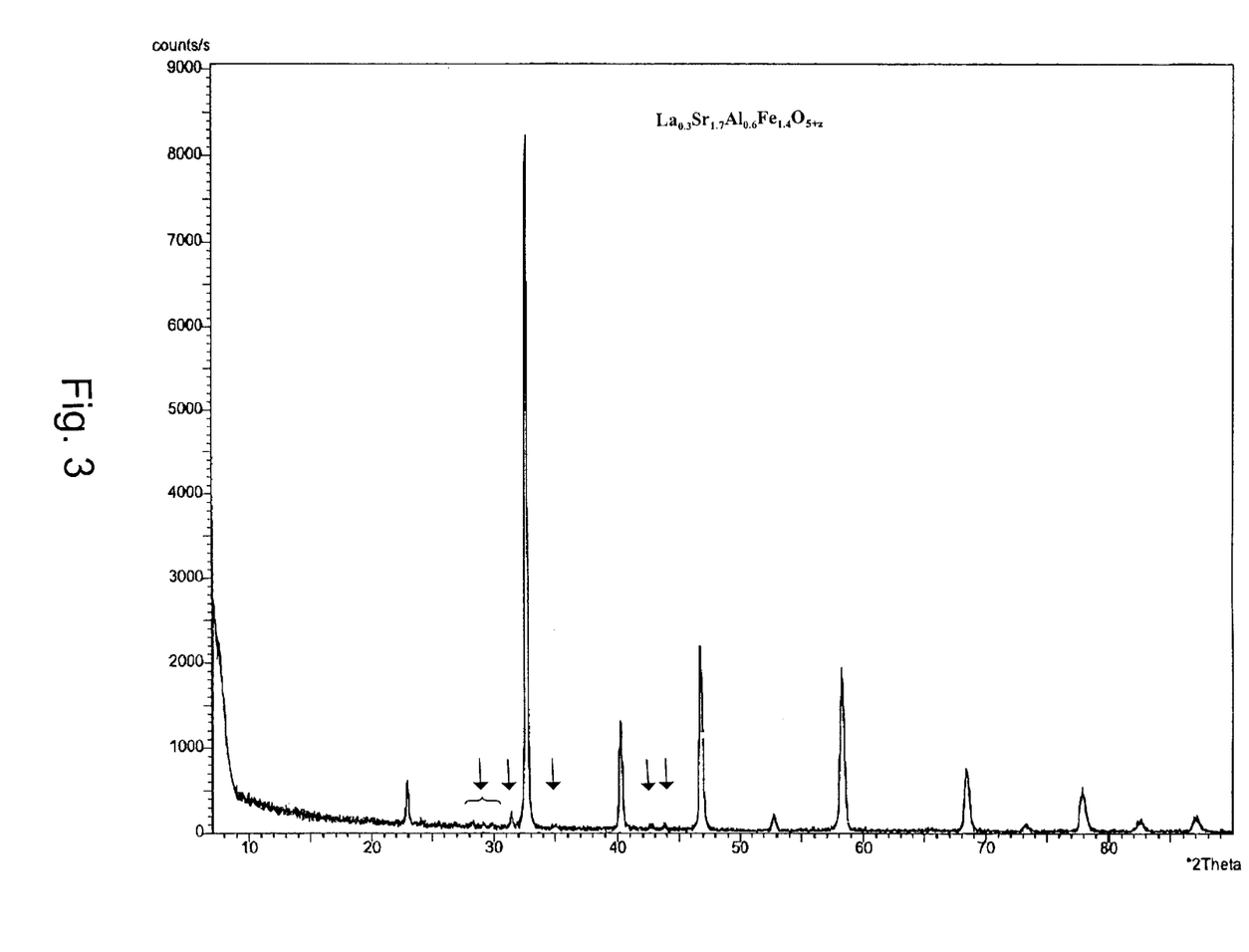
FIG. 3 is an X-ray diffraction scan of the mixed phase membrane material of Example 4 which contains an $La_{0.3}Sr_{1.7}Al_{0.6}Fe_{1.4}O_{5+z}$ MIEC phase and about 2 w % of second phase(s).

Membranes were prepared as in B above with no adjustment for LOI. LOI determination indicates that this composition is about 2 wt % off-stoichiometric. An X-ray diffraction pattern of this membrane materials is provided in FIG. 3. The diffraction pattern with peaks at 28–31, 35 and 43–44 indicates the presence of a about 2 wt % of second phases.

Example 5

$La_{0.5}Sr_{1.5}Al_{0.6}Fe_{5+z}$ was prepared as in Example 3 above combining the following starting materials of the same purity and source:

21.48 g of $La_2O_3$ 58.39 g of $SrCO_3$ 29.47 g of $Fe_2O_3$ 8.07 g of $\alpha$-$Al_2O_3$ (99.99% purity by weight on a metals basis)

Figure 4:
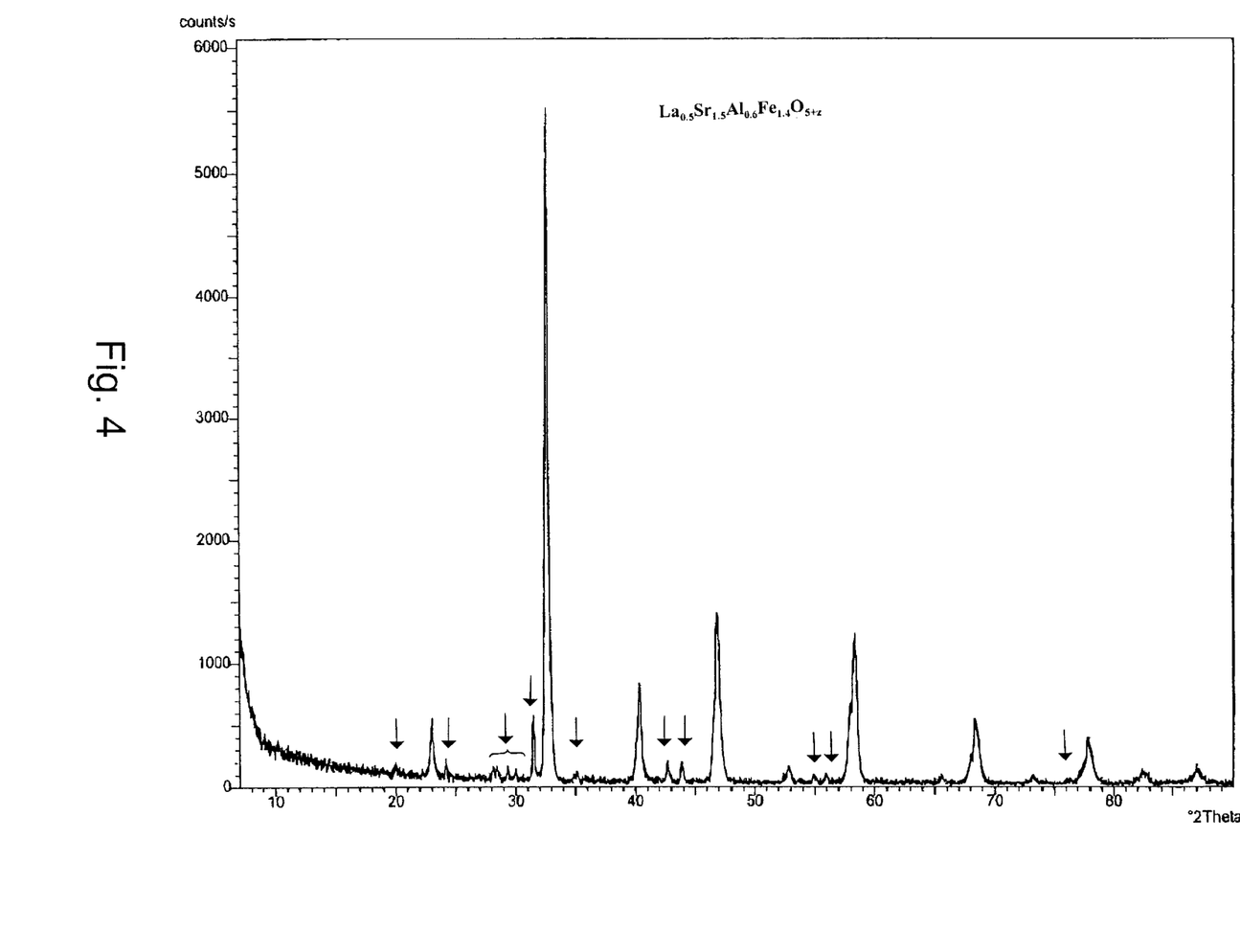
FIG. 4 is an X-ray diffraction scan of the mixed phase membrane material of Example 5 which contains an $La_{0.3}Sr_{1.5}Al_{0.6}Fe_{1.4}O_{5+z}$ MIEC phase and about 7–8 wt % of second phase(s).

Membranes were prepared as in Example 3 above. An X-ray diffraction pattern of this membrane materials is provided in FIG. 4 with peaks at indicating the presence of about 7 wt %–8 wt % of second phases. LOI determinations indicated that this composition should be about 9 wt % off stoichiometric.

Example 6

A mixed phase material was prepared as in Example 3 above combining the following starting materials of the same purity and source:

17.87 g of $La_2O_3$ 91.78 g of $SrCO_3$ 29.20 g of $Fe_2O_3$ 18.64 g of $\alpha$-$Al_2O_3$ (99.99% purity by weight on a metals basis)

Figure 5:
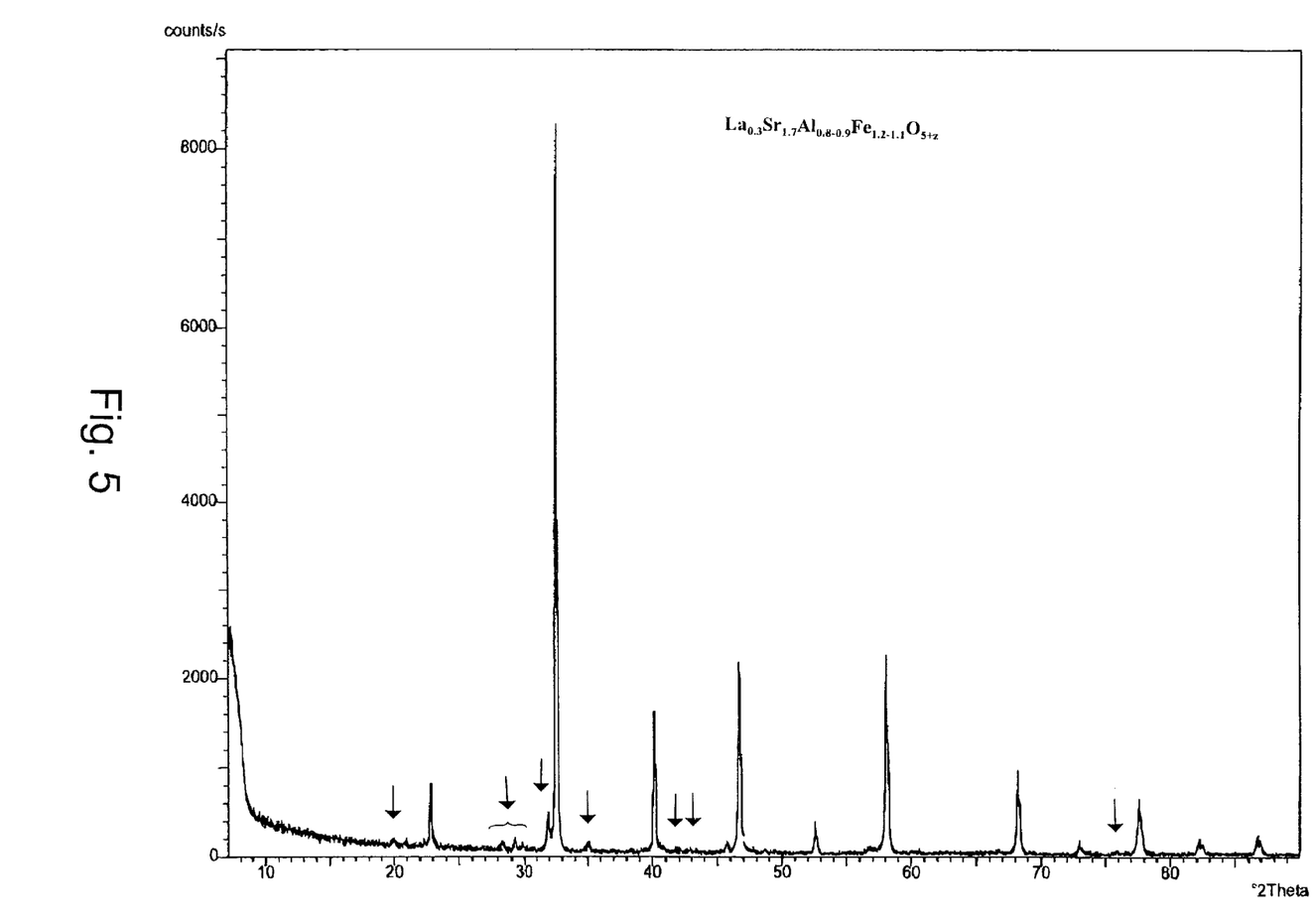
FIG. 5 is an X-ray diffraction scan of the mixed phase membrane material of Example 6 which contains an $La_{0.3}Sr_{1.7}Al_xFe_xO_{5+z}$ MIEC phase where x is 0.8–0.9 and y' is 1.2 to 1.1 and about 10% of second phase(s).

This combination was intended to produce an MIEC of formula stoichiometry $La_{0.3}Sr_{1.7}Al_{1.0}Fe_{1.0}O_{5+z}$. However, the predominant phase formed is believed to have the formula $L_{0.3}Sr_{1.7}Al_{0.8-0.9}Fe_{1.2-1.1}O_{5+z}$. Excess aluminum above that incorporated into the MIEC phase was incorporated into the second phase or phases. Membranes were prepared as in Example 3 above. An X-ray diffraction pattern of this membrane materials is provided in FIG. 5 indicating the presence of about 10 wt % of second phases.

Example 7

Preparation of Thin Film Membranes

Membranes for catalytic membrane reactors can be prepared by coating a substrate with a thin film (about 10-about 300 μm thick) of a mixed metal oxide material of this invention. In particular a porous substrate material can be coated with a dense thin film of these materials to provide a substantially gas impermeable membrane. In general, thin films are applied to selected substrates by methods known in the art, including tape casting, dip coating or spin coating. Presently preferred thin film-coated membranes are prepared using a porous membrane as a substrate where the porous membrane is made of a mixed metal oxide of the same or similar composition to the ion and electron conduction mixed metal oxide that will comprise the thin film. Use of a substrate that has the same or a similar (preferably within about 20% of) thermal expansion coefficient as the thin film material will minimize or avoid cracking of the film and/or membrane on heating. Furthermore, use of a chemically similar material for both the substrate and thin film will minimize undesired reactivity of the two materials with each other and undesired reactivity of the substrate with gases in the reactor. Porous membranes of the mixed metal oxides of this invention can be prepared in a variety of ways, for example, by combining the metal oxide with an organic filler (up to about 20% by weight), such as cellulose or starch particles of a selected size range 9, e.g. about 20 $\mu$m particles), shaping or pressing the desired membrane and sintering. The organic filler is destroyed and removed on sintering leaving desired pores of a selected size in the membrane. Thin films are preferably uniformly thick and crack-free on firing. Uniform deposition of films can for example be obtained by use of colloidal suspensions of the metal oxide in a selected solvent. The suspension is applied to the porous substrate by conventional coating or casting methods to give a uniform deposition which on firing gives a film of uniform thickness. An alternative method for applying thin films is the use of co-polymeric precursors which comprise metal oxide incorporated into the polymer. Flat membranes or tubular membranes can be prepared having dense thin films of the metal oxide mixed ion and electron conductors of this invention.

Example 8

The derived expression for ionic conductivity may be given by:

$$\sigma T = A \exp(-\Delta H_m/KT)$$

Here K is the Boltzmann constant and $-\Delta H_m$ is the enthalpy of activation and is equivalent to $E_a$. Equation (1) shows that the overall ionic conductivity, $\sigma$, is a function of both an exponential term and pre-exponential term. The pre-exponential term A, given in the following equation is related to the number of charge carriers present in the solid-state lattice where an intrinsically high population of oxygen vacancies are present, thereby contributing to high ionic conductivity.

$$A = (Z\lambda^2 e^2/6\upsilon_0 \exp(\Delta S_m/K)$$

Here $\Delta S_m$ is the activation entropy, C is the fraction of available sites occupied by mobile ions, $\lambda$ is the jump distance, Z is the number of jump directions, $\upsilon_0$ is the molar volume, and e is the electronic charge.

The performance of a ceramic membrane placed in a CMR is based on its ability to promote the desired reaction, i.e., production of syngas, conversion of hydrocarbons by reaction with oxygen. These reactions proceed based on the materials' ability to conduct both oxygen and electrons. Under appropriate reactor conditions, production or conversion rates can be correlated directly with the materials' ionic and electronic conductivity. A direct comparison of the single phase membranes and mixed phase membranes in CMRs has not been carried out due to the fragility of the pure single phase membranes.

In this case, a separate method of measuring conductivity based on a hydrogen-oxygen fuel cell can be carried out. Conductivity tests of this type can be performed on ceramic disks, rather than the tubes used in CMRs. A sample pellet is coated on opposite sides with appropriate anode and cathode catalysts, such as nickel and silver, respectively. A current carrier wire is attached to each electrode. A gas tight seal is made on each side of the material with a glass spring. Oxygen and hydrogen gas flow through opposite sides of the cell. A computer-controlled program is run to heat the cell over a predetermined temperature range, with data taken at appropriate temperature intervals. A comparison of the theoretical open circuit potential with the measured cell potential for the reaction:

is made at each temperature. Electronic conductivity in the material results in a drop in the open circuit potential. Thus, the electronic contribution to the total conductivity can be determined at each temperature. Ionic conductivity is determined by applying a load to the cell, and measuring the voltage drop across the load. At a given temperature, a series of loads can be applied, from which a voltage versus current curve can be generated, the slope of which corresponds to the resistance of the material. Results of measurement of ionic conductivity of single phase MIEC and mixed phase membranes of this invention typically do not differ significantly. In some cases, ionic conductivity of the mixed phase material is lower than that of the corresponding single phase MIEC.

Example 9

Mechanical Strength of Membranes

Mechanical strength assessment can be carried out on these materials according to American Society for Testing and Materials (ASTM) Standard Test Method C 1161 for Flexural Strength of Advanced Ceramics at Ambient Temperature. The 4-point flexural Strength tests described in this method provide direct comparison of Strength of single phase and mixed phase membrane materials.

Example 10

SEM and TEM Measurements

Standard art-known scanning electron microscopy and transmission electron microscopy can be employed to detect and quantify the amounts of second phase(s) present in membrane materials.

Figure 6A:
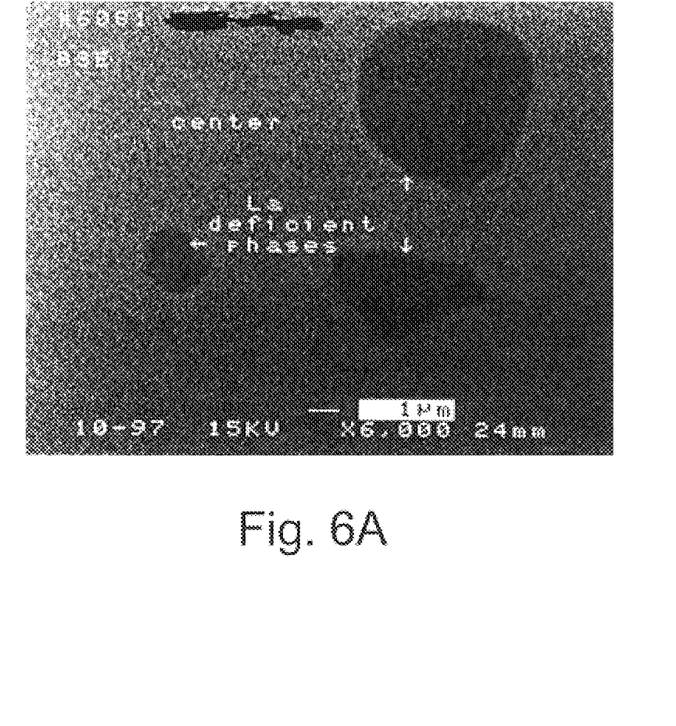
FIGS. 6A and 6B are SEM images of mixed phase material containing $La_{0.3}Sr_{1.7}Ga_{0.6}Fe_{1.4}O_{5+z}$. La-deficient phases are the dark grains indicated by arrows.
Figure 6B:
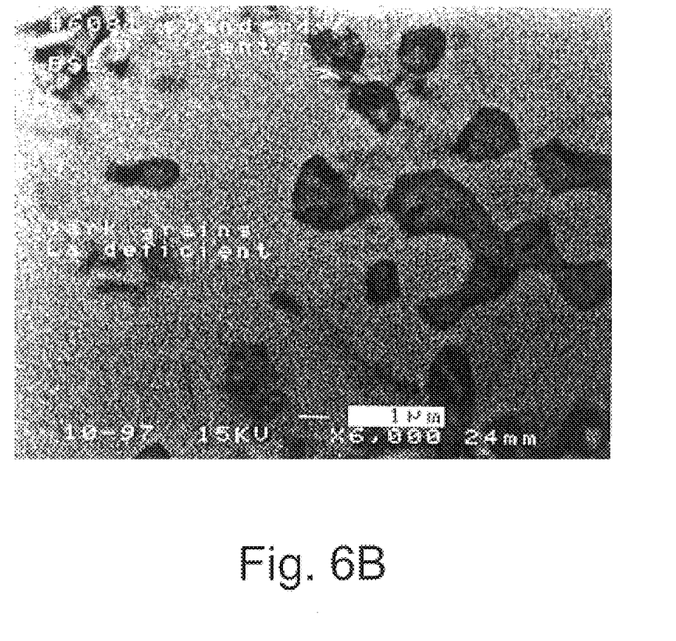

FIGS. 6A and 6B illustrate SEM images of mixed phase materials containing $La_{0.3}Sr_{1.7}Ga_{0.6}Fe_{1.4}O_{5+z}$ prepared by mixing starting materials without compensating for LOI. The materials employed in these SEM images are not the same as those of Example 3 and FIG. 2. The level of second phases in these materials are higher than those of Example 3, and are estimated based on the SEM images as being present at 5–10 wt %. La-deficient second phases are indicated in FIGS. 6A and 6B as dark grains on the images. FIG. 6A and 6B are images of different samples of the same material, indicating distribution of the second phase throughout the material.

Figure 7A:
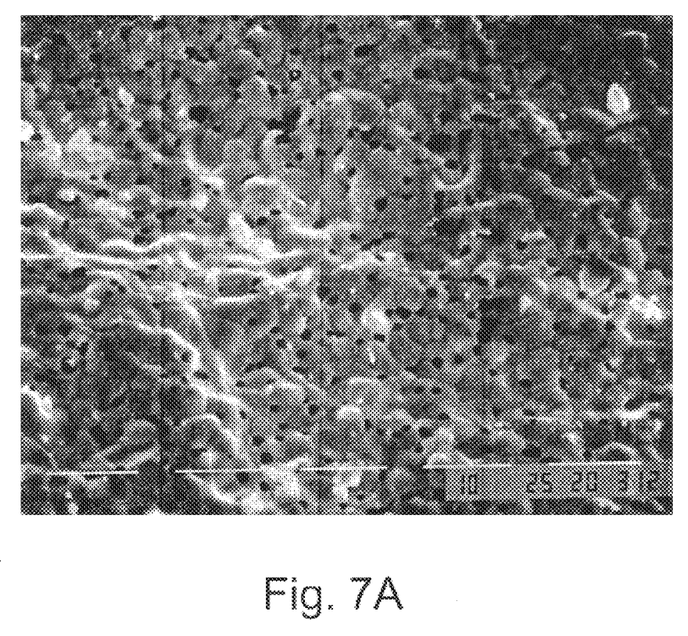
FIG. 7A is a SEM image of mixed phase containing MIEC $La_{0.3}Sr_{1.7}Ga_{0.6}Fe_{1.4}O_{5+z}$ indicating the presence of second phases.
Figure 7B:
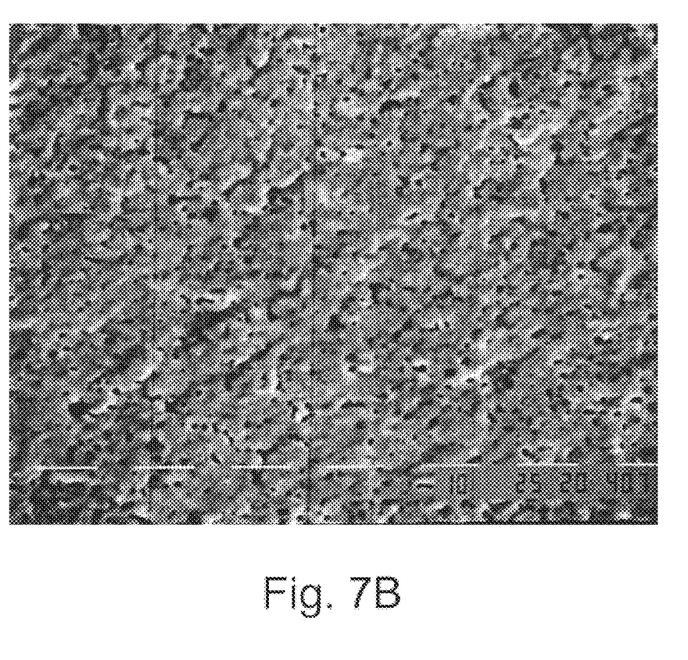
FIG. 7B is a SEM image of mixed phase containing MIEC $La_{0.3}Sr_{1.7}Ga_{0.2}Al_{0.4}Fe_{1.4}O_{5+z}$ indicating the presence of second phases.

Microprobe analysis by energy dispersive analysis by X-ray (EDX) shows these second phase regions to be deficient in La, relative to the bulk phase. This is consistent with formation of a $SrAl_2O_{0.4}$ type phase as seen in the XRD patterns. The second phase regions are dispersed throughout the grains, and range in size from approximately 1–8 micrometers in diameter. The accompanying SEM maps are of $La_{0.3}Sr_{1.7}Ga_{0.6}Fe_{1.4}O_{5+x}$ (FIG. 7A) and $La_{0.3}Sr_{1.7}Ga_{0.2}Al_{0.4}Fe_{1.4}O_{5+x}$ (FIG. 7B) and show similar results. In these examples, phases are present in amounts of 5–10%.

Those of ordinary skill in the art will appreciate that methods, materials, reagents, solvents, membrane structures and reactors other than those specifically exemplified herein can be employed or adapted without undue experimentation to the practice of this invention. All such variants in methods, materials, reagents, solvents, structures and reactors that are known in the art and that can be so adapted or employed are encompassed by this invention.

All references cited herein are incorporated in their entirety by reference herein to the extent not inconsistent herewith.

We claim:

1. A gas-impermeable mixed phase ceramic catalytic reactor membrane which comprises about 80% by weight or more of a mixed ionic and electronic conducting first phase and from about 0.1 to about 20% by weight of one or more structurally distinct second phases which impart mechanical strength to the membrane, wherein said second phase or phases is formed from one or more of the same metal elements as the first phase; wherein the mixed ionic and electronic conducting first phase has the formula:

$$A_x A'_{x'} A''_{2-(x+x')} B_y B'_{y} B''_{2-(y+y')} O_{5+z}$$

where A is an element from the f block lanthanide elements; A' is an element selected from the Group 2 elements; A" is an element from the f block lanthanide or Group 2 elements; B is an element selected from Al, Ga, In or mixtures thereof; B' and B" are different elements and are selected independently from the group of elements consisting of Mg, and the d-block transition elements; $0<x<2$, $0<x'<2$, $0<y<2$, $0<y'<2$ where $x+x'\leq 2$ and $y+y'\leq 2$, and z varies to maintain electroneutrality, said membrane being made by forming the first and second phase or phases simultaneously by mixing an off-stoichiometric ratio of the first-phase materials.

2. The catalytic reactor membrane of claim 1 wherein said second phase(s) are selected from $(A, A')_2(B, B')O_4$, $A'_2(B, B')O_4$, $(A, A')(B, B')_2O_4$, $A'(B, B')_2O_4$, $A_2(B, B')O_4$, $A(B, B')_2O_4$, $A_2BO_4$, $AB_2O_4$, $A_2B'O_4$, $AB'_2O_4$, $A'_2BO_4$, $A'B_2O_4$, $A'_2B'O_4$, $A'B'_2O_4$, $(Sr,La)_2(Al,Fe)O_4$ and $Sr(Fe,Al)_2O_4$.

3. The catalytic reactor membrane of claim 2 wherein in the mixed ionic and electronic conducting phase $0.05<x<1$, $1<x'<1.95$, $0.25<y<1.2$, and $0.8<y'<1.75$.

4. The catalytic reactor membrane of claim 1 wherein the first and second phases are metal oxides.

5. The catalytic reactor membrane of claim 1 wherein the second phases are selected from $(A, A')_2(B, B')O_4$, $A'_2(B, B')O_4$, $(A, A')(B, B')_2O_4$, $A'(B, B')_2O_4$, $A_2(B, B')O_4$, and $A(B, B')_2O_4$.

6. The catalytic reactor membrane of claim 1 wherein the second phases are selected from $A_2BO_4$, $AB_2O_4$, $A_2B'O_4$, $AB'_2O_4$, $A'_2BO_4$, $A'B_2O_4$, $A'_2B'O_4$, and $A'B'_2O_4$.

7. The catalytic reactor membrane of claim 1 wherein in the mixed ionic and electronic conducting phase $0.05<x<1$, $1<x'<1.95$, $0.25<y<1.2$, and $0.8<y'<1.75$.

8. The catalytic reactor membrane of claim 1 wherein the second phases represent about 1 wt % to about 20 wt % of the membrane.

9. The catalytic reactor membrane of claim 1 wherein in the mixed ionic and electronic conducting phase B is Ga or Al.

10. The catalytic reactor membrane of claim 1 wherein A is La and A' is Sr.

11. The catalytic reactor membrane of claim 1 wherein the first phase has the formula:

$$La_x Sr_{2-x} B_y B'_{2-y} O_{5+z}.$$

12. The catalytic reactor membrane of claim 11 wherein B is Ga or Al.

13. The catalytic reactor membrane of claim 12 wherein B' is Fe.

14. The catalytic reactor membrane of claim 13 wherein the second phase or phases are selected from $(Sr,La)_2(Al,Fe)O_4$ or $Sr(Fe,Al)_2O_4$.

15. The catalytic reactor membrane of claim 1 consisting essentially of about 80% or more by weight said first phase and from about 0.1 to about 20% by weight of said second phase or phases.

16. A ceramic membrane reactor having a gas-impermeable membrane of claim 1.

17. A ceramic membrane reactor for the production of synthesis gas having the gas-impermeable membrane of claim 1.

* * * * *